(12) United States Patent
Heggdal et al.

(10) Patent No.: US 10,077,861 B2
(45) Date of Patent: Sep. 18, 2018

(54) SUBSEA HEATING ASSEMBLY AND METHOD OF HEATING A SUBSEA COMPONENT

(71) Applicant: Aker Subsea AS, Lysaker (NO)

(72) Inventors: Ole A. Heggdal, Finstadjordet (NO); Ole Johan Bjerknes, Oslo (NO); Hjalmar Nystrøm, Oslo (NO)

(73) Assignee: Aker Solutions AS, Lysaker (NO)

( * ) Notice: Subject to any disclaimer, the term of this patent is extended or adjusted under 35 U.S.C. 154(b) by 825 days.

(21) Appl. No.: 14/376,608

(22) PCT Filed: Feb. 15, 2013

(86) PCT No.: PCT/EP2013/053086
§ 371 (c)(1),
(2) Date: Aug. 4, 2014

(87) PCT Pub. No.: WO2013/121000
PCT Pub. Date: Aug. 22, 2013

(65) Prior Publication Data
US 2015/0048079 A1 Feb. 19, 2015

(30) Foreign Application Priority Data
Feb. 17, 2012 (NO) .................................. 20120172

(51) Int. Cl.
*H05B 6/00* (2006.01)
*F16L 53/00* (2018.01)
(Continued)

(52) U.S. Cl.
CPC ............. *F16L 53/004* (2013.01); *F16L 53/34* (2018.01); *F16L 53/37* (2018.01); *F16L 53/38* (2018.01); *H05B 6/101* (2013.01)

(58) Field of Classification Search
CPC ..... F16L 53/004; F16L 53/007; F16L 53/008; F16L 53/30; F16L 53/34; F16L 53/37;
(Continued)

(56) References Cited

U.S. PATENT DOCUMENTS 3,755,650 A 8/1973 Ando
4,704,515 A 11/1987 Offermann
(Continued)

FOREIGN PATENT DOCUMENTS

DE 102008056089 A1 7/2010
EP 2166637 A1 3/2010
(Continued)

OTHER PUBLICATIONS

Hutter, Manfred, "International Search Report," prepared for PCT/EP2013/053086, dated Jul. 18, 2013, four pages.
(Continued)

*Primary Examiner* — Dana Ross
*Assistant Examiner* — Joseph Iskra
(74) *Attorney, Agent, or Firm* — Winstead PC (57) ABSTRACT

Subsea heating assembly, comprising a component interface cable (9) in association with a subsea component (7') to be heated. The component interface cable receives power from an electric power source. The power source comprises an induction coupler (100) with core rings which surround an alternating current carrying source cable (5), and a winding cable (107) wound around the core ring The winding cable connects to the component interface cable. The induction coupler comprises an upper section (100a) with first core parts (101a) and a lower section (100b) with second core parts (101b). The winding cable is arranged in the upper section. The first core parts are aligned with second core parts when the upper section is landed on the lower section. The upper section is removable from the lower section.

9 Claims, 11 Drawing Sheets

(51) Int. Cl.
*H05B 6/10* (2006.01)
*F16L 53/34* (2018.01)
*F16L 53/37* (2018.01)
*F16L 53/38* (2018.01)

(58) Field of Classification Search
CPC .......... F16L 53/00; F16L 53/38; H05B 6/101; H05B 6/36
USPC ....... 219/535, 618, 643, 600, 606, 607, 613, 219/615, 616, 624, 629, 633, 635, 673, 219/674, 676; 405/158; 166/302; 285/41
See application file for complete search history.

(56) References Cited

U.S. PATENT DOCUMENTS

| | | | |
|---|---|---|---|
| 6,166,359 A | 12/2000 | Cruickshank | |
| 6,278,095 B1 | 8/2001 | Bass et al. | |
| 6,371,693 B1 * | 4/2002 | Kopp | F16L 53/007 137/341 |
| 9,429,263 B2 | 8/2016 | Lervik et al. | |
| 2008/0236810 A1 | 10/2008 | Bornes et al. | |
| 2010/0101663 A1 * | 4/2010 | Granborg | F16L 53/004 137/341 |
| 2011/0309990 A1 | 12/2011 | Parsche | |
| 2014/0376900 A1 | 12/2014 | Bjerknes et al. | |
| 2015/0016812 A1 | 1/2015 | Radan et al. | |

FOREIGN PATENT DOCUMENTS

| | | |
|---|---|---|
| WO | WO-2006075913 A1 | 7/2006 |
| WO | WO-2007011230 A1 | 1/2007 |
| WO | WO-2010135772 A1 | 12/2010 |

OTHER PUBLICATIONS

Martin, Gea Haupt, "International Search Report," prepared for PCT/EP2013/053272, dated Jul. 3, 2013, three pages.

* cited by examiner

SUBSEA HEATING ASSEMBLY AND METHOD OF HEATING A SUBSEA COMPONENT

The present invention relates to a subsea heating assembly adapted to heating of various types of subsea components. In particular it is adapted to heating of subsea metal components used in the oil and gas industry.

BACKGROUND

In the field of subsea hydrocarbon production, the formation of hydrates and/or wax deposits is a well known problem. At low temperatures hydrocarbons may solidify and limit or block the flow in the subsea pipelines. One known measure is to insert inhibitors into the flowing well stream, such as MEG.

Another method includes ensuring a certain temperature of the flowing fluid. This is for instance achieved with a method referred to as direct electrical heating (DEH). The method involves arranging a cable along a steel pipe and connecting it to the steel pipe at two distant positions. By applying an alternating current to the cable, and thus also through the steel pipe, the latter becomes heated due to both ohmic and inductive power dissipation. The DEH method is often employed to heat pipelines of several kilometers of length. International patent application WO2007011230 describes such a solution.

In addition to heating long lengths of flow lines, one will sometimes need to heat smaller subsea components such as a Xmas tree or a shorter length of pipe. Sometimes one also wants to heat a specific part of a pipeline more extensively than what is possible with the installed DEH components. Patent publication U.S. Pat. No. 6,278,095 describes a solution where an electric cable is wound around a subsea component which shall be heated as an induction coil (cf. the jumper 27 in FIG. 5 of the said publication). Electrical power is supplied to the induction coils from current flow in the walls of the heated segment of pipeline or from an external source such as a subsea transformer or ROV.

U.S. Pat. No. 6,371,693 describes (in FIG. 9a) a toroidal transformer used to extract electrical power for small electrical loads, such as heating of pipeline jumpers, operating equipment or other purposes subsea.

Patent application publication US20100101663 A1 describes heating of a pipeline by using the inherent resistivity of its electrically conductive sections. In addition it describes using the pipeline as a power distribution line to provide auxiliary power to remote pipeline locations.

German publication DE102008056089 A1 describes a method of measuring the condition of a pipeline, typically an offshore pipeline.

THE INVENTION

According to a first aspect of the present invention there is provided a subsea heating assembly, comprising a component interface cable arranged in association with a subsea component to be heated, which component interface cable receives power from an electric power source. Here, the term "in association with" shall mean that the component interface cable is arranged in order to heat the subsea component which shall be heated. Thus it may for instance be placed alongside and in proximity to the subsea component, wound around the component or arranged in a serpentine configuration close to or in contact with the component. The electric power source comprises an induction coupler with one or more core rings which surrounds an alternating current carrying source cable, and a winding cable wound around the core ring. The winding cable is connected to the component interface cable. The induction coupler comprises an upper section with a first number of first core parts and a lower section with a second number of second core parts. The winding cable is arranged in the upper section. The first core parts are aligned with second core parts when the upper section is installed with the lower section. According to the first aspect of the invention the upper section is removable from the lower section.

The core ring is of a material capable of conducting magnetic flux. The term ring shall be broadly interpreted, as the function of the core ring is to guide magnetic flux around the source cable. Thus, the term ring comprises for instance a quadratic or other polygon shape, or an oval or concentric ring shape.

Furthermore, the term "wound around", as in "wound around the core ring", shall comprise a full turn, multiple turns, and even less than a full turn. As will be appreciated by the person skilled in the art, the technical result of the winding of the winding cable is to induce electric current in the winding cable. Thus, any number of turns or any percentage of a full winding that provides the needed technical result of inducting current in the winding cable should be understood to be comprised by the term "wound around".

The source cable functions as a primary winding and the winding cable function as a secondary winding.

The subsea component which shall be heated can for instance be a wellhead or a Xmas tree, a pipe spool or a pipe section, or a pipe interface section between a DEH system end termination and wellhead.

The current-carrying source cable can be a direct electric heating cable arranged alongside a subsea pipeline in order to heat said pipeline.

According to an embodiment of the first aspect of the invention, the core ring which comprises the two core parts is adapted to take an open and a closed state. In the closed state, the core ring encircles a void adapted to receive the current-carrying source cable. Moreover, in the open state, the core ring exhibits a gap between two facing end sections of the core ring, through which the current-carrying source cable may pass.

The induction coupler can advantageously comprise three sets of one or more core rings. Each set is adapted to be associated with one phase of a electric source cable comprising three phases.

In one embodiment, said first number is smaller than the second number.

According to a second aspect of the present invention, there is provided a method of heating a subsea component. The method comprises a) arranging a component interface cable in association with the subsea component. The component interface cable is adapted to, as current is fed through it, cause induction losses or resistive losses in the component interface cable or in the subsea component, thereby heating the subsea component;

b) arranging one or more core rings of an induction coupler around an electric source cable;

c) connecting the component interface cable to the induction coupler; and d) delivering alternating electric current to the component interface cable via the induction coupler by feeding alternating current through the source cable;

wherein step b) comprises i) arranging a lower section of the induction coupler on one side of the electric source cable; and ii) arranging an upper section of the induction coupler on another side of the electric source cable;

in such way that one or more core rings of the induction coupler encircles the electric source cable, as the lower section comprises one or more second core parts and the upper section comprises one or more first core parts which together with the second core parts constitute the one or more core rings. According to the second aspect of the invention, a winding cable of the induction coupler is connected, directly or indirectly, to the component interface cable and is wound only about the first core parts of the first core parts and the second core parts.

According to a third aspect of the present invention, there is provided a method of heating a subsea component. This method comprises a) arranging a component interface cable in association with the subsea component, the component interface cable being adapted to, when current is fed through it, cause induction losses or resistive losses in the component interface cable or in the subsea component, thereby heating the subsea component;

b) arranging a core ring or core rings of an induction coupler around an electric source cable;

c) connecting the component interface cable to the induction coupler; and d) delivering alternating electric current to the component interface cable via the induction coupler by feeding alternating current through the source cable, as a winding cable of the induction coupler is connected to the component interface cable. According to the third aspect of the present invention, a lower section of the induction coupler is arranged on one side of the electric source cable and an upper section of the induction coupler is arranged on the other side of the electric source cable. The method further comprises the following step e) adjusting the characteristics of the induction coupler by i) retrieving the upper section to the surface;

ii) altering the number of first core parts in the upper section and/or altering the number of turns with which a winding cable is wound around one or more first core parts, as the core rings are made up of separable and aligned first core parts in the upper section and second core parts in the lower section; and iii) arranging the upper section back onto the lower section, in a position where the first core parts are aligned with the second core parts so as to constitute one or more complete core rings.

With such a method, the physical construction and accordingly the characteristics of the induction coupler can be altered in an appropriate manner.

According to a fourth aspect of the present invention, there is provided a subsea induction coupler adapted to be arranged in association with an alternating current carrying subsea source cable in order to couple electric power from the source cable to a winding cable which is wound around one or more core rings in the induction coupler. According to the fourth aspect of the invention, the subsea induction coupler comprises an upper section with one or more first core parts and a lower section with one or more second core parts. The upper section and the lower section are adapted to be assembled together in such way that the one or more first core parts and the one or more second core parts together form one or more core rings which surround a channel capable of accommodating said source cable. A winding cable of the induction coupler is wound only about the first core parts of the first core parts and the second core parts.

For the various aspects of the invention, in some embodiments the current-carrying source cable can be a direct electric heating (DEH) cable arranged alongside a subsea pipeline in order to heat said pipeline. The DEH cable can for instance be arranged in the manner known in the art as piggyback style. Such DEH cables are used to heat the pipeline by means of losses in the steel in the pipeline. These losses are often a combination of induction losses and resistive losses.

It should be understood by the person skilled in the art that the terms upper section and lower section of the induction coupler shall not be construed in a strict sense. Rather it is a manner of describing that two different induction coupler sections may be assembled together into a complete induction coupler, regardless of their orientation with respect to the vertical or horizontal.

EXAMPLE OF EMBODIMENT

While the present invention has been described in general terms above, a more detailed non-limiting example of embodiment will be given in the following with reference to the drawings, in which.

Figures 1, 2:
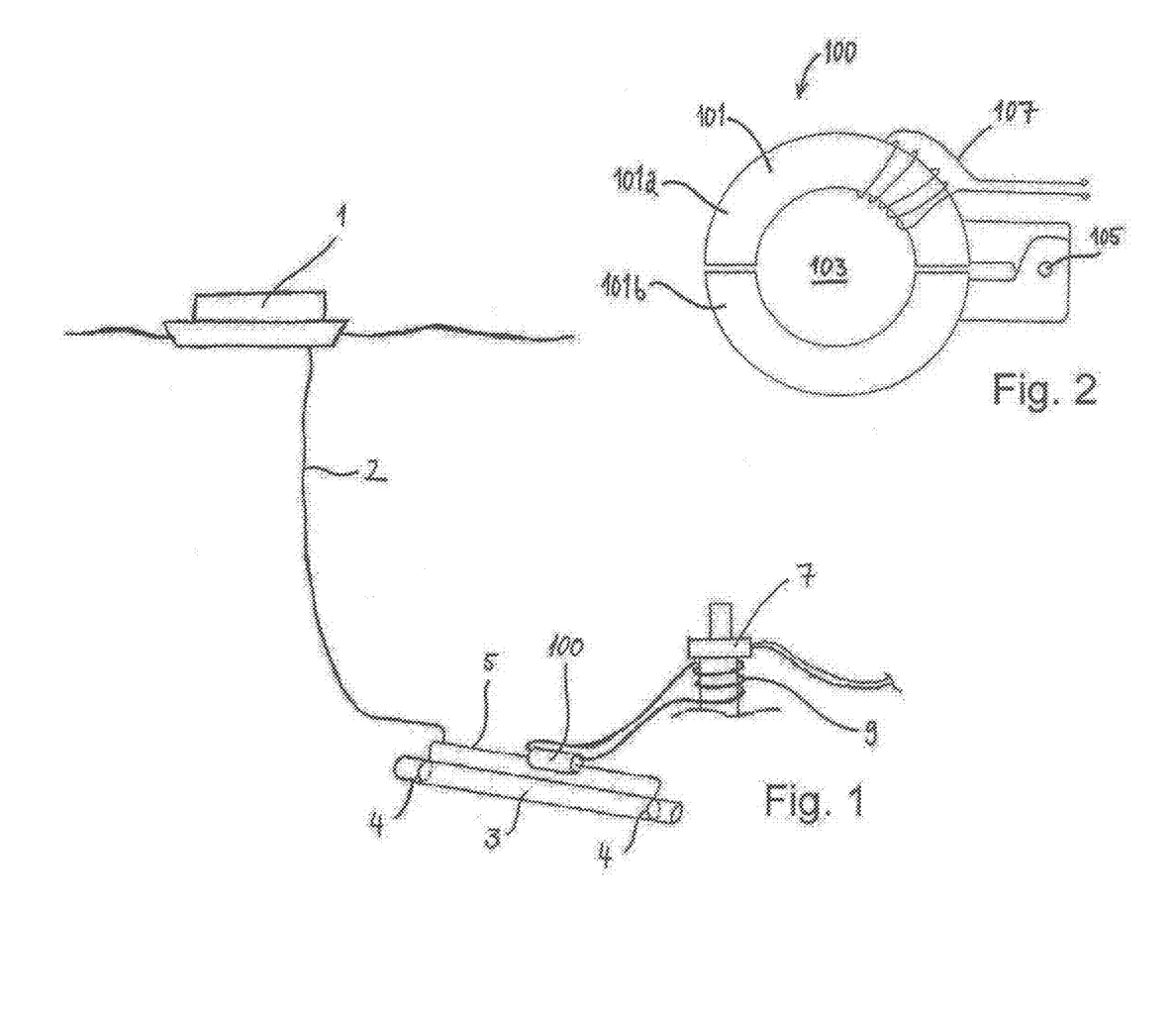
FIG. 1 is a principle view of a subsea heating assembly according to the invention, in association with a subsea pipeline which is heated with a DEH cable powered from a floating installation.
FIG. 2 is a principle side view of an induction coupler.

FIG. 1 shows a principle view of a floating installation 1, such as an FPSO installation (floating production storage and offloading) floating on the sea surface. On a seabed there is arranged a steel pipeline 3 which conducts hydrocarbon containing fluid. As this is only a principle drawing, the steel pipe 3 is shown without its end terminations or associated subsea components.

The pipeline or flowline arrangement on the seabed would be similar for a fixed gravity based structure (GBS), jacket or subsea-based installation.

To the steel pipe 3 there is arranged a pipe interface cable 5 which is provided with an alternating current through a feeding cable 2 that extends from the floating installation 1. In the embodiment shown in FIG. 1, the pipe interface cable 5 extends between a pair of electric interfaces 4 to the steel pipeline 3. The pipe interface cable 5 may be strapped onto the pipeline 3. In the art this is known as a "piggyback" cable. The pipe interface cable 5 may extend tens of kilometers along the pipeline 3, between said electrical interfaces 4. Such a heating technique is known as DEH (direct electrical heating). With this technique an alternating current is guided partly through the steel pipe and partly through the ambient sea water. The steel pipe 3 will become heated partly due to induction losses in the steel and partly due to the resistive losses in the steel.

Other power cables can also be installed piggy-back style for heating or other purposes. For instance a three phase power supply cable for combinations of flow-line heating and ac-motor drives.

Other heating techniques are also known to the person skilled in the art, such as pipe-in-pipe technique.

On the right hand side of FIG. 1 there is schematically shown an induction coupler 100. In this embodiment, the induction coupler 100 is installed in association to the DEH system described above. As will be described in further detail below (FIG. 2), the induction coupler comprises a core ring 101 which circumvents the pipe interface cable 5. Moreover a winding cable 107 is wound about the core ring, so that current will be induced in the winding cable when current flows in the pipe interface cable. This induced current is then used to heat subsea components, such as a Xmas tree 7 schematically illustrated at the far right side of FIG. 1.

FIG. 2 shows the induction coupler 100 in a schematic view, in order to explain its function. In this embodiment, it has a core ring 101 which is divided into a first core part 101a and a second core part 101b. Together the first and second core parts 101a, 101b form a circular shape which encircles a void 103. The induction coupler 100 can be mounted on the pipe interface cable 5 by separating the core parts 101a, 101b and arranging the pipe interface cable 5 in the void 103. In this embodiment, the core parts are attached in a hinge 105.

Still referring to FIG. 2, a winding cable 107 is wound about a section of the first core part 101a. Thus, when alternating current flows through the pipe interface cable 5, a magnetic flux will be induced in the core ring 101. The magnetic flux will further induce an alternating current in the winding cable 107. According to the present invention, this induced current will be used to heat a subsea component 7, such as the XT shown in FIG. 1, typically by induction.

Figures 3, 4:
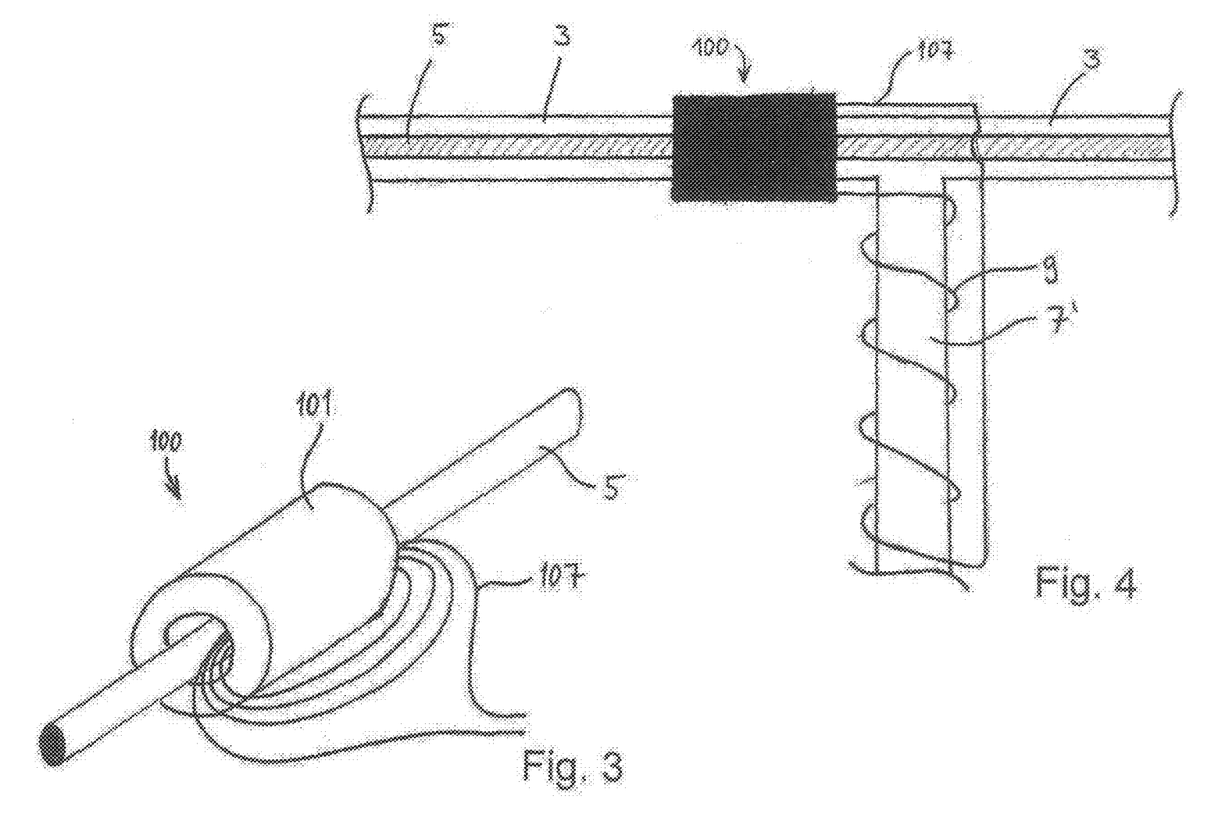
FIG. 3 is a principle perspective view of an induction coupler arranged about an alternating current carrying cable.
FIG. 4 is a principle top view of a steel pipe with a piggyback DEH cable and a pipe spool branch which is to be heated by means of the heating assembly according to the present invention.

FIG. 3 is another principle sketch of the induction coupler 100. In this embodiment the induction coupler 100 has a core ring 101 without a first and second core part. In stead, the core ring 101 is made in one piece. As a result, the pipe interface cable 5 needs to be threaded through the void 103.

It should be noted that the pipe interface cable 5, as described in the embodiments herein, could be another kind of alternating current carrying source cable. Thus, then invention is not limited to a source cable 5 employed for heating of a pipeline 3.

FIG. 4 is a top view, showing the steel pipeline 3. On top of the pipeline the pipe interface cable 5 is strapped (piggyback). In this embodiment, a pipe spool 7' is branched off the steel pipe 3. The pipe spool 7' is also a steel pipe. The pipe interface cable 5 does however not extend along the pipe spool 7' and thus it is heated by other means. To provide heating of the pipe spool 7' an induction coupler 100 is attached to the steel pipe 3 and the core ring 101 of the induction coupler 100 encircles the pipe interface cable 5. The winding cable 107 extending out from the induction coupler 100 is connected to a component interface cable 9 which is wound about the pipe spool 7'. Due to the current running in the component interface cable 9, heat is induced in the pipe spool 7'. A similar embodiment will be explained in more detail further below.

Figure 5:
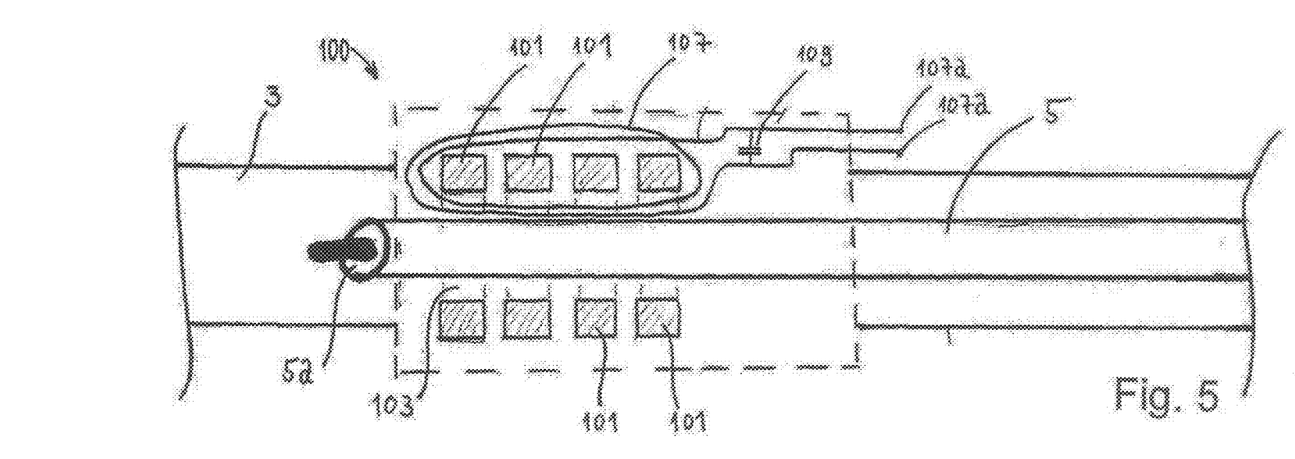
FIG. 5 is a principle top view of parts of the heating assembly according to the invention.

FIG. 5 shows a principle view of one embodiment of the induction coupler 100. In this embodiment the induction coupler 100 has four core rings 101 which encircle the pipe interface cable 5. Furthermore, in this embodiment the winding cable 107 is wound twice about all four core rings 101. The winding cable 107 ends in two winding cable contacts 107a to which the component interface cable 9 can be connected (cf. FIG. 4). Between the two winding cable contacts 107a a capacitor 109 can be arranged for optimal functionality. The capacitor 109 will boost or adapt the current-voltage relationship of the winding cable 107 to the characteristics of the component interface cable 9. The latter will depend on how the component interface cable 9 is used. For instance, if wound about the pipe spool 7' as illustrated in FIG. 4, the component interface cable 9 will exhibit an inductive characteristic. Also indicated in FIG. 5 is an isolation mantle 5a arranged about the conductor of the pipe interface cable 5.

Figure 6:
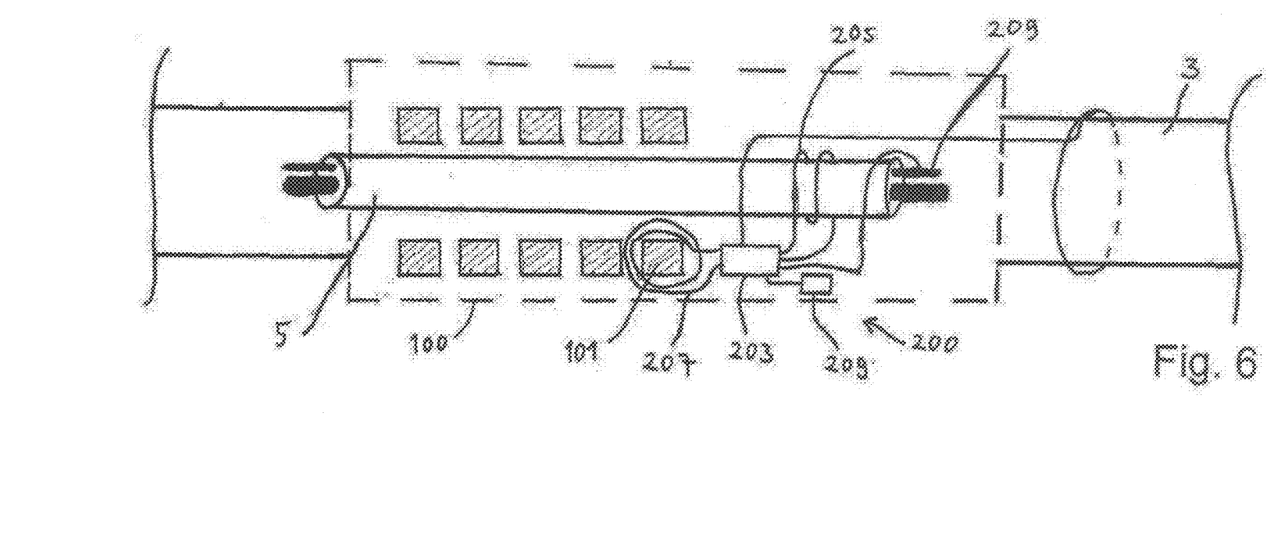
FIG. 6 is a principle top view of an alternative embodiment of the heating assembly.

A similar yet different embodiment is shown in FIG. 6. In this embodiment the induction coupler 100 exhibits five core rings 101 extending about the pipe interface cable 5. Furthermore, in association with the induction coupler 100 there is arranged a current gauge 200. The current gauge 200 has a central unit 203 to which at least one current measuring device 205 is coupled. In this embodiment there is arranged one current measuring device 205, typically a Rogowski coil which is wound around the pipe interface cable 5. As current or voltage is induced in this current measuring device 205, the central unit 203 may read the amount of current flowing through the pipe interface cable 5. In addition there may be arranged another current measuring device 205' which is wound about the steel pipe 3. With this current measuring device 205', the central unit 203 may read the amount of electrical current flowing in the steel pipe 3. In order to provide electrical power to operate the central unit 3, a power supply cable 207 connected to the central unit 203 is wound about one or more core rings 101. The magnetic flux in the core ring(s) 101 will induce current in the power supply cable 207.

The current gauge 200 will be valuable to the operator in order to monitor the current flowing through the electrical cable 5 and/or the steel pipe 3. In order to transmit the measured current values to the operator, the current gauge 200 exhibits communication means. The communication means may include an acoustic transponder 209 capable of sending acoustic signals to a surface vessel or ROV on demand through the sea water. In another embodiment one could imagine a transmitter with connections to an optical wire 209' arranged in the pipe interface cable 5. Current measurements from the far end of the pipe interface cable could be a valuable supplement to condition monitoring for a DEH system.

Figure 7:
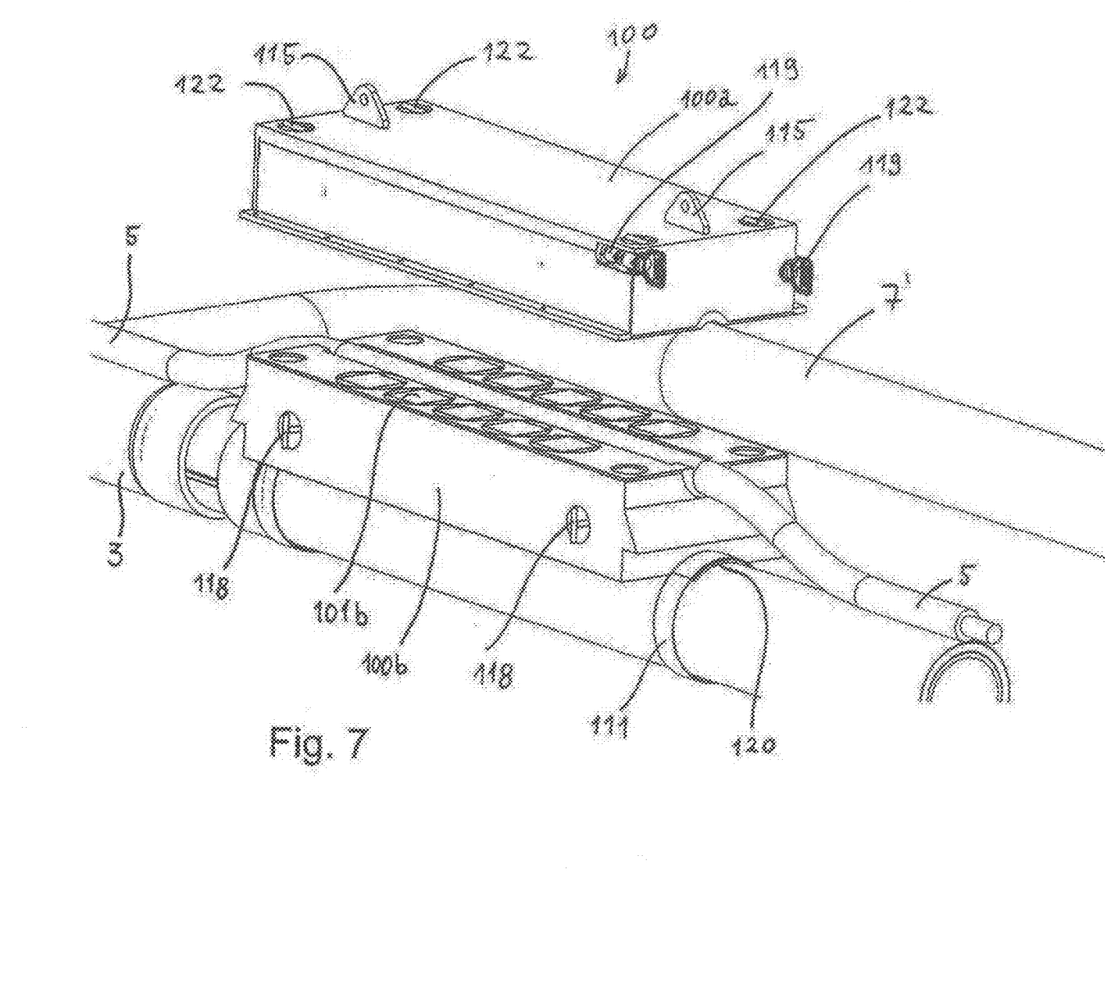
FIG. 7 is a perspective view of the induction coupler of the heating assembly.

FIG. 7 is a perspective view of a more realistic embodiment of the induction coupler 100. The induction coupler 100 has an upper section 100a and a lower section 100b. Both exhibit an elongated box configuration. The lower section 100b is strapped onto the steel pipe 3 by means of straps 111. In the lower section 110b five second core parts 101b are arranged in a row. Along the row of second core parts 101b and between the ends of the respective second core parts 101b there is a channel 113 which is adapted to receive the pipe interface cable 5.

Corresponding to the lower section 100b, the upper section 100a has a row of five first core parts 101a arranged in such a way that they register with the five second core parts 101b when the upper section 100a is landed on the lower section 100b. Thus, when the upper section 100a has landed, the first and second core parts 101a, 101b will constitute five core rings 101 that encircle the pipe interface cable 5.

When installing the lower section 100b on the steel pipe 3, the pipe interface cable 5 must first be moved away. It can for instance be lifted and pulled away with a pair of lift straps. In order to make it possible to lift away a portion of the pipe interface cable 5, the straps with which it is connected to the steel pipe 3 needs to be removed along a sufficient distance of the pipe interface cable 5. Furthermore, when installing the pipe interface cable 5, one should ensure that it exhibits sufficient slack to make it possible to make room for the later installation of the lower section 100b.

When the lower section 100b has landed onto the steel pipe 3, an ROV (not shown) will rotate two ROV interfaces 118 which in this embodiment are shaped as T-bars. The rotation will result in movement of a pair of attachment elements 120 along the direction of the steel pipe 3. The attachment elements 120 will be inserted under straps 111 as they move along the axial direction of the steel pipe 3. One strap 111 is arranged on each axial side of the lower section 110b.

Before landing the upper section 100a, the pipe interface cable 5 is placed in the channel 113. When landing the upper section 100a it can be suspended on a wire (not shown) from a crane and guided with an ROV (not shown). The wire can be connected to two pad eyes 115. Furthermore, when the upper section 100a has been landed onto the lower section 100b, it is locked to the lower section 100b by rotating a set of locking handles 122. The locking handles 122 can be rotated with an ROV and functionally engage not shown locking means which ensures that the upper section 100a is securely attached to the lower section 100b.

In order to prevent sea water from being trapped between the facing end faces of the first core parts 101a and the second core parts 101b, the space in which these end faces are located may be purged after landing of the upper section 100a. One may use for instance an inert gas or an inert liquid. Another way to prevent the presence of sea water is to coat the said ends with a gel which will be forced away when the ends approach each other. Preferably the ends will be in contact with each other after landing, in order to ensure a small loss as possible of magnetic flux in the core rings.

In order to reduce the effective weight of the upper and lower section 100a, 100b of the induction coupler 100, a foam or other buoyancy element can be arranged within them.

Figure 8:
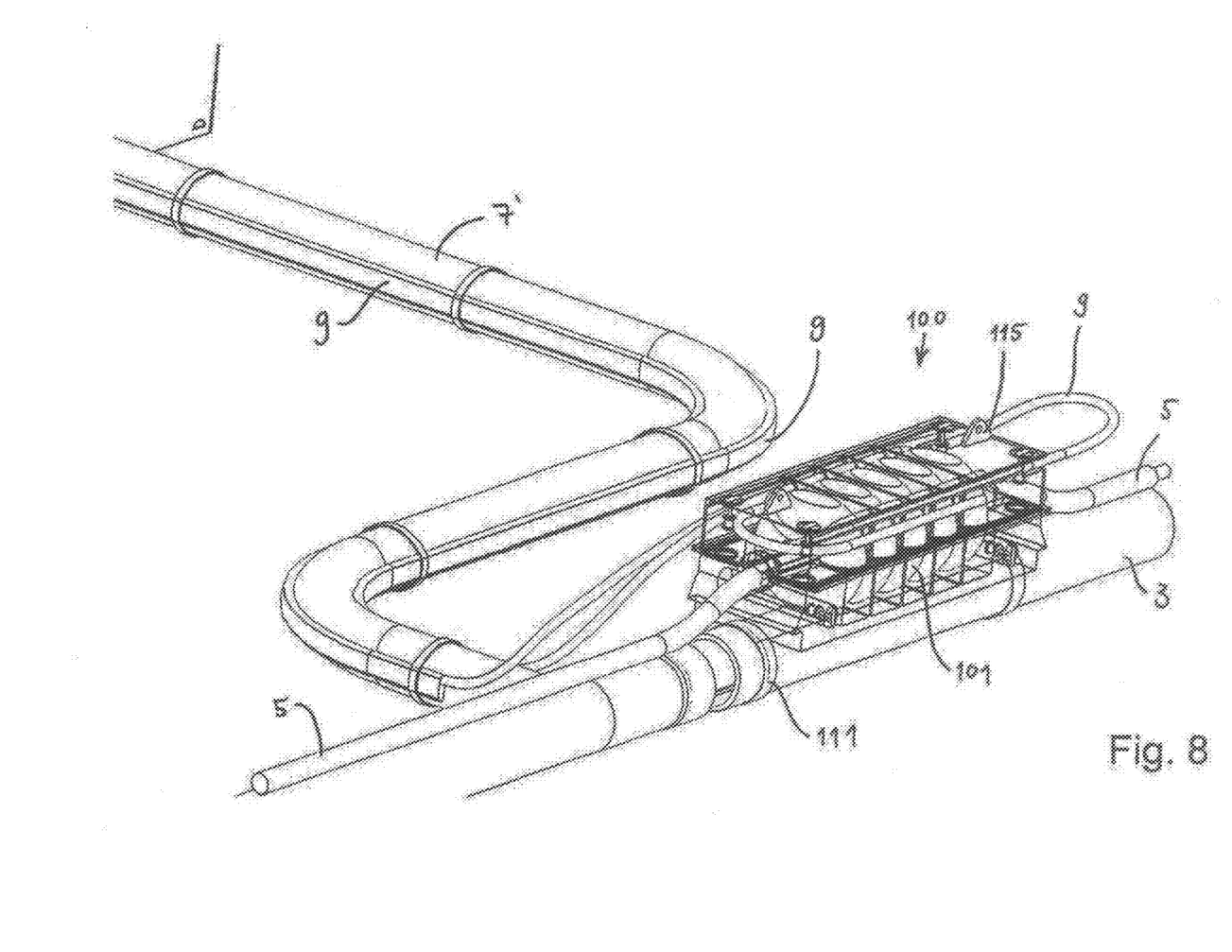
FIG. 8 is a perspective view of the induction coupler shown in FIG. 7 and a pipe spool which shall be heated.

FIG. 8 shows the induction coupler 100 shown in FIG. 7 in a state where the upper section 100a has been landed onto the lower section 100b. For illustrational purpose the outer face of the induction coupler 100 is transparent in FIG. 8. In the described embodiment the subsea component which shall be heated is a pipe spool 7' corresponding to the pipe spool 7' shown in FIG. 4. However, in this embodiment the component interface cable 9 is strapped onto the pipe spool 7' along the extension of the pipe spool 7', whereas in the embodiment shown in FIG. 4, the component interface cable 9 was wound around the pipe spool 7'. The alternating current in the component interface cable 9 will heat the pipe spool 7', typically by induction.

Figure 9:
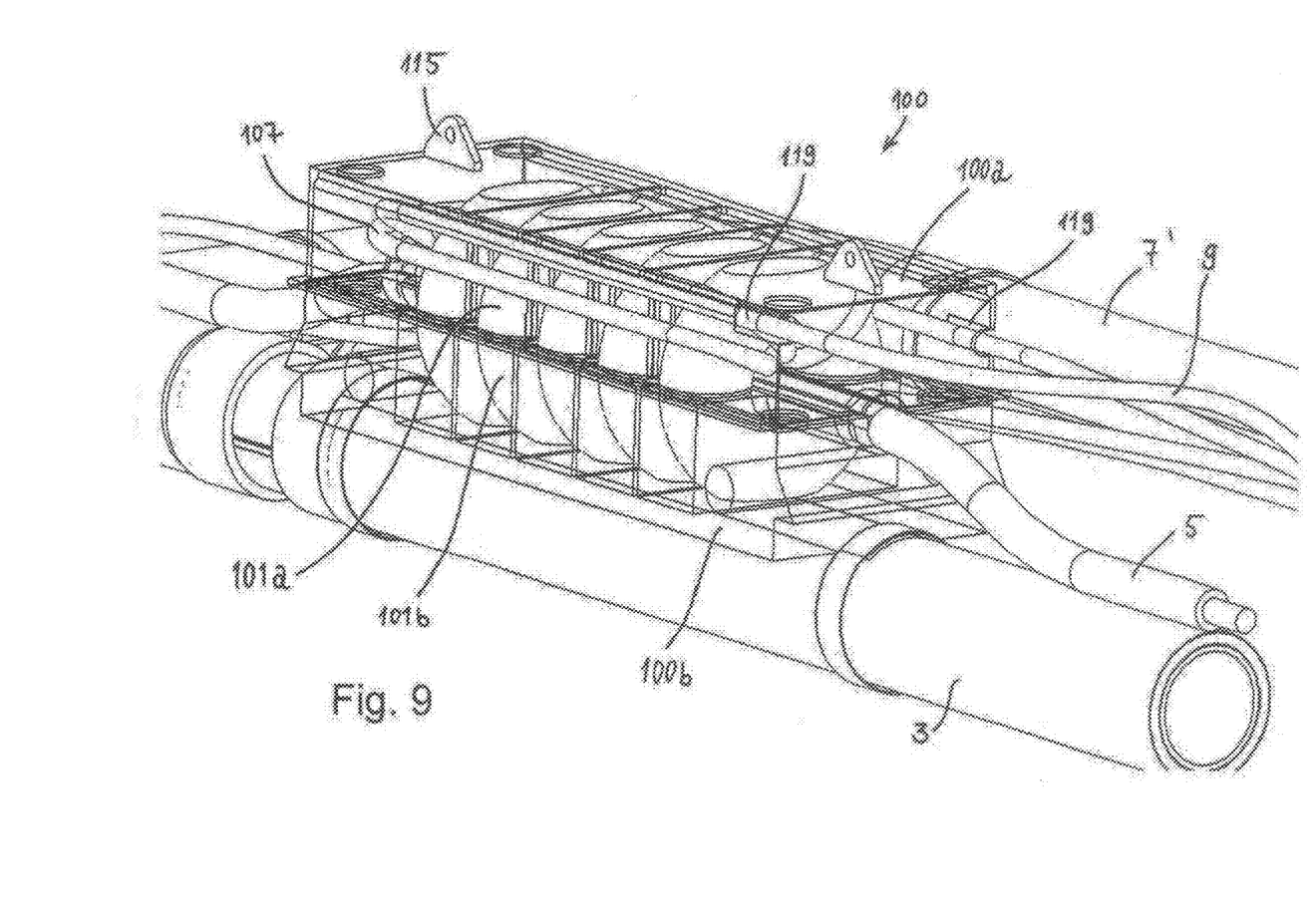
FIG. 9 is an enlarged perspective view of the induction coupler shown in FIG. 7.

A more detailed view of the induction coupler 100 is shown in FIG. 9. In this drawing the winding cable 107 is shown wound three times about the five core rings 101. Also shown are wet-mate connectors 119 adapted to connect the winding cable 107 to the component interface cable 9 (or possibly a cable between the component interface cable and the winding cable). These are also shown in FIG. 7, however with dummy plugs inserted into the connectors 119.

Figure 10:
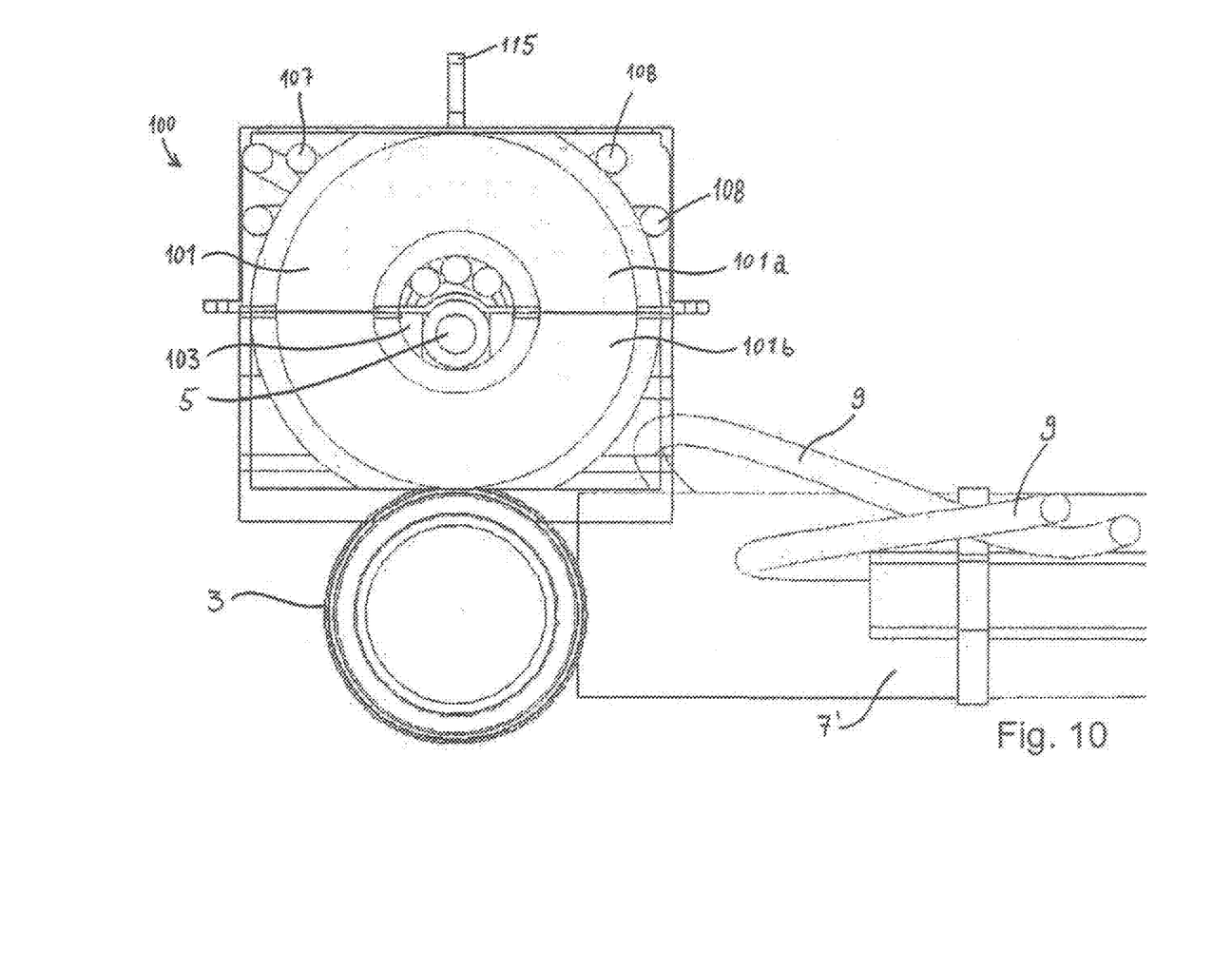
FIG. 10 is a cross section view of the induction coupler shown in FIG. 7.

FIG. 10 shows a particular embodiment with a cross section view of an induction coupler 100 and the steel pipe 3 along a plane crosswise to the axial direction of the steel pipe 3. From this view one can see how the winding cable 107 is extended three times through the void 103 (cf. FIG. 2) of the core rings 101 and three times along their outsides. The number of turns can be adapted to the application in question.

On the outside of the core rings 101 there are two link cables 108 extending between the wet-mate connectors 119 and the winding cable 107. Of course, the link cables 108 can indeed be the same cable as the winding cable 107.

It will be appreciated by the person skilled in the art the number of core rings 101 in the induction coupler 100 can be chosen according to the needed power transmission to the winding cable 107. Thus, one may employ only one core ring 101, two core rings, or even ten or more core rings 101.

Figure 16:
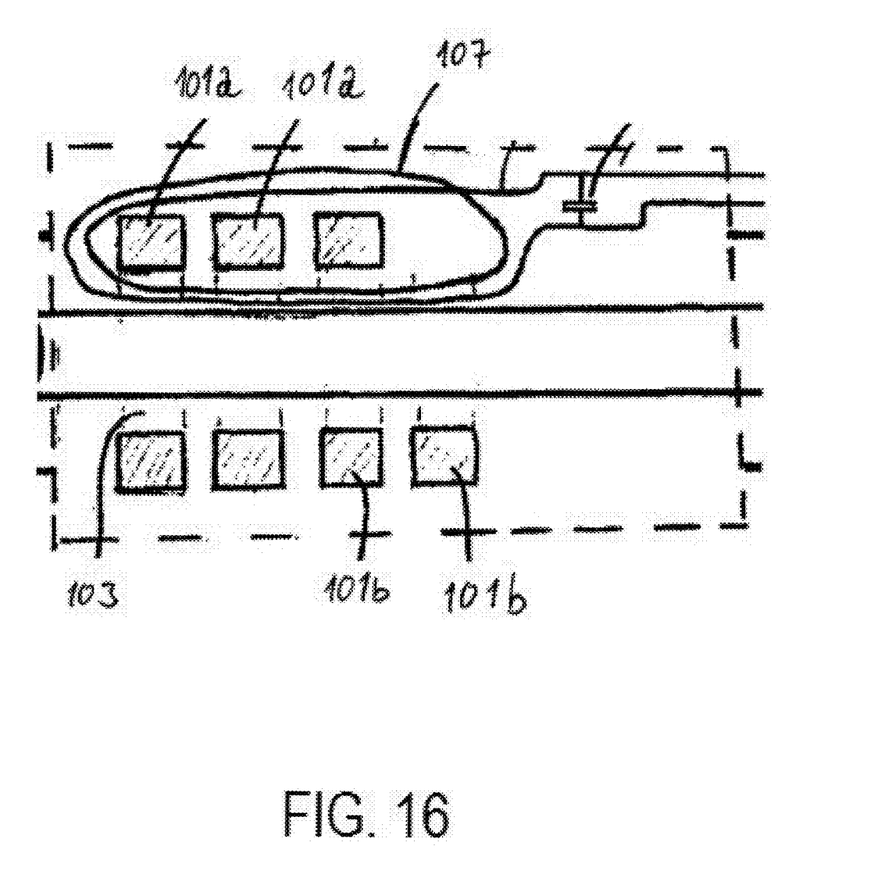
FIG. 16 is a is a principle top view of parts of an alternative embodiment of the heating assembly.

As shown in the embodiment illustrated with the cross section view of FIG. 10, the windings of the winding cable 107 are wound only about first core parts 101 a arranged in the upper section 100 a. This feature makes it possible to retrieve only the upper section 100 a of the induction coupler 100 if one needs to adapt the characteristics of the induction coupler 100. For instance, the operator may wind the winding cable 107 a lesser or higher number of turns around the core rings 101, or the first core parts 101 a. Furthermore, one can also imagine that he only needs to wind the winding cable 107 around only a few of the available core rings 101, for instance around only four of the five core rings shown in FIG. 9. In such a situation the operator may also remove the core rings 101, or the first core parts 101 a respectively, which are not needed. In that case he may install an upper section 100 a with for instance three first core parts 101 a onto a lower section 100 b which exhibits four second core parts 101 b (e.g., see FIG. 16).

Figure 11A:
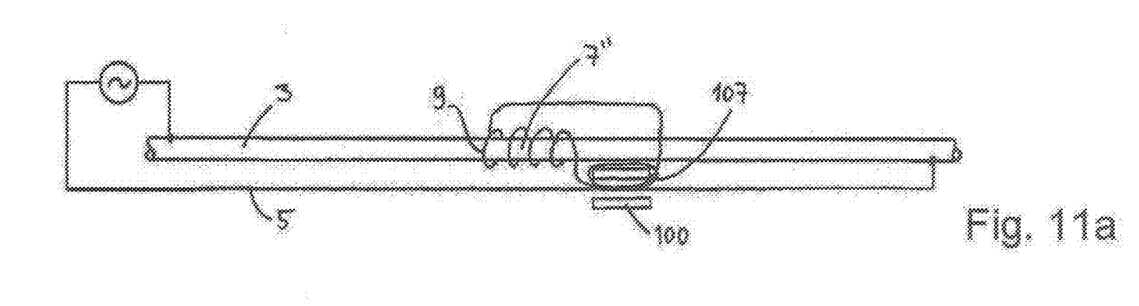
FIG. 11*a* to 11*c* are principle views of particular embodiments of the heating assembly according to the invention.
Figure 11B:
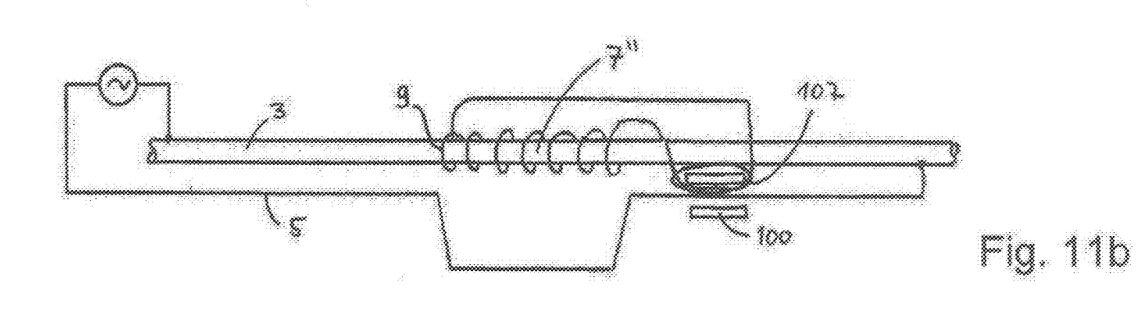
Figure 11C:
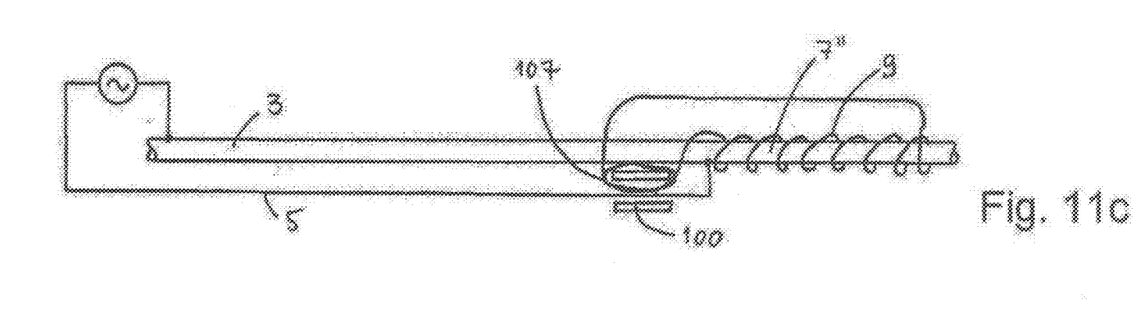

FIG. 11a, FIG. 11b, and FIG. 11c are schematic views of some particular embodiments of the subsea heating assembly according to the present invention. In these embodiments the component interface cable 9 is wound about the pipeline 3. As in the previously described embodiment, a pipe interface cable 5 is extended along the pipeline 3 in order to heat the pipeline 3. In these embodiments the component 7" to be heated is a section of the pipeline 3.

In the embodiment shown in FIG. 11a, the pipe interface cable 5 extends along and strapped onto the pipeline 3. Thus it heats the corresponding length of the pipeline 3. At one section of the heated pipeline 3, additional heating is provided by winding a component interface cable 9 about the section of the pipeline 3. Power to the component interface cable 9 is proved from the induction coupler 100 which is connected to the pipe interface cable 5.

In the embodiment shown in FIG. 11b, the pipe interface cable 5 is moved away from the pipeline 3 in the section which is heated with the component interface cable 9. Thus, along this section, the pipe interface cable 5 does not contribute to the heating of the pipeline 3.

In the embodiment shown in FIG. 11c, the pipe interface cable 5 is strapped onto the pipeline 3 along its entire length. A section of the pipeline 3 which is located beyond this length is heated with the component interface cable 9. The component interface cable 9 is supplied with electric power from the induction coupler 100 arranged about the pipe interface cable 5.

Figures 12, 13, 14:
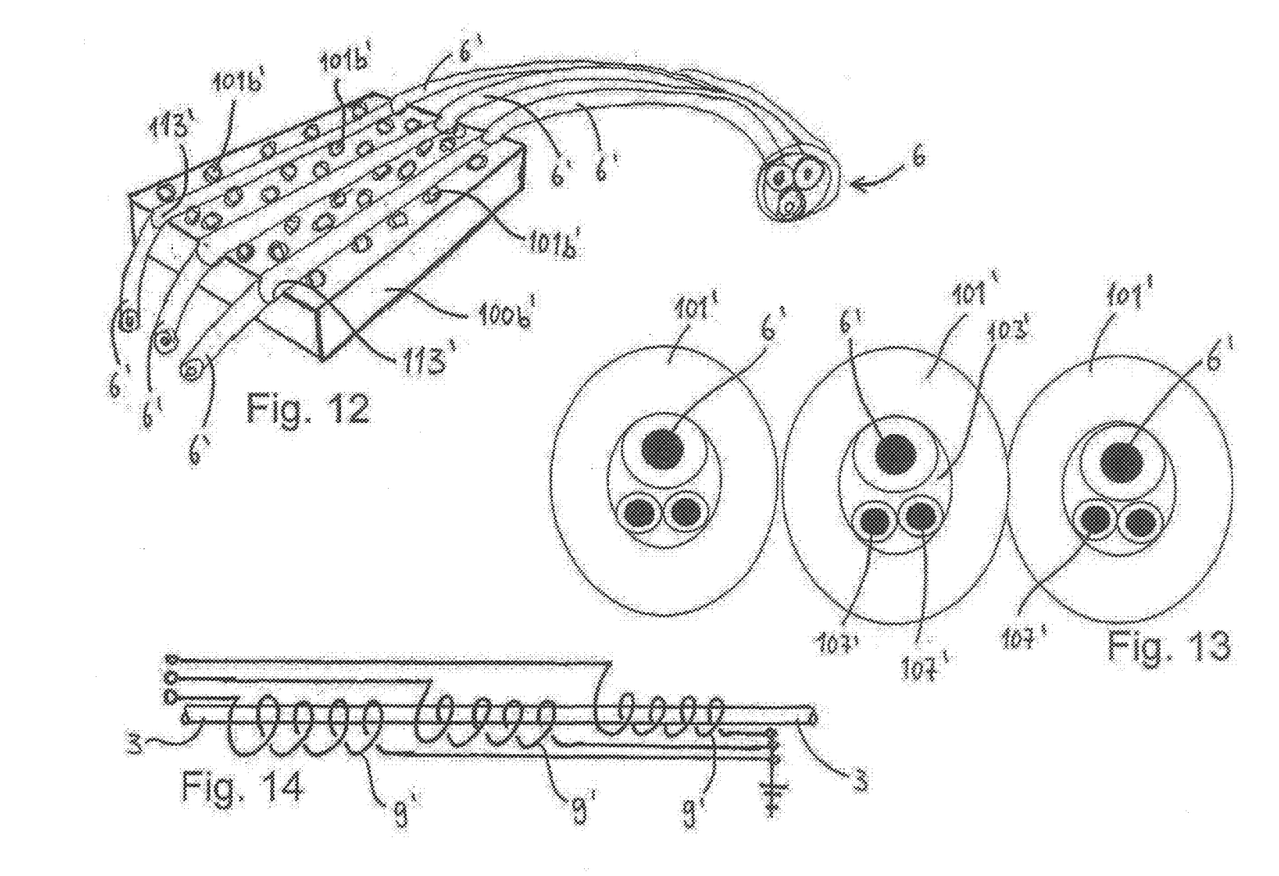
FIG. 12 is a principle view of a three-phase embodiment of the induction coupler.
FIG. 13 is a principle cross section view through the core rings of the induction coupler illustrated in FIG. 12.
FIG. 14 is a principle view of a possible layout of component interface cables connected to the three-phase induction coupler shown in FIG. 12.

Whereas the embodiments described above shows an induction coupler 100 adapted for transferring power from one pipe interface cable 5, FIG. 12 illustrates a lower section 100b' of an induction coupler 100' adapted for a three-phase source cable 6. The conductors 6' of the three-phase source cable 6 are split and each conductor is arranged in a separate channel 113'. In FIG. 12 only the lower section 100b' is shown. The three-phase induction coupler 100' does however also include an upper section 100a', which is not shown.

FIG. 13 schematically shows how the three conductors 6' of the three-phase pipe interface cable 6 run through the voids 103' of the respective core rings 101', along with two turns of the winding cable 107'.

FIG. 14 schematically shows how each of the three phases of the component interface cables 9' can be arranged to heat separate portions of a steel pipe 3' about which the phases are wound.

Figure 15:
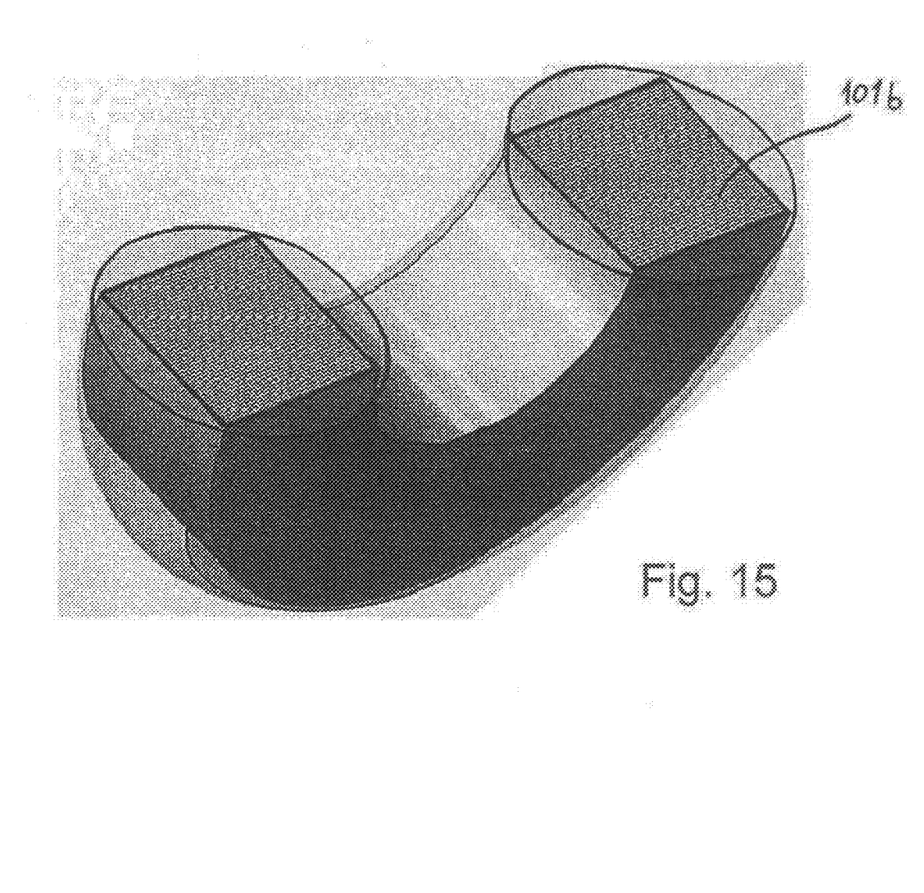
FIG. 15 shows a perspective view of a core part of a core ring arranged within an induction coupler and with a laminated core design.

FIG. 15 shows a second core part 101b. This perspective view shows how the cross section of the metallic laminated core ring 101 has a rectangular shape. The laminated core ring can have a steeped shape, which is typical for transformer cores. About the rectangular cross section is a circular shaped protection, typically molded around the core.

As will be appreciated by the person skilled in the art, the component interface cable 9 can be arranged in association to the subsea component 7 which shall be heated in a number of different ways. For instance, the component interface cable 9 may be wound around the subsea component, or arranged in parallel alongside it, or may be applied with a serpentine configuration. This will depend on the embodiment in question.

Furthermore, as will be appreciated by the person skilled in the art, the heating assembly according to the present invention is not limited to be used in association with a pipe interface cable such as the DEH cable described in the above embodiments. The alternating current-carrying source cable can indeed be another AC carrying cable which can extend through the core ring(s) of the induction coupler.

It should also be appreciated that the subsea heating assembly according to the present invention can be employed to heat any kind of subsea equipment, such as the pipe spool and Xmas tree as described above. Furthermore, the heating can be based in induction losses and/or resistive losses.

The invention claimed is:

1. A subsea heating assembly comprising:
a component interface cable arranged in association with a subsea component to be heated, which component interface cable receives power from an electric power source;
wherein said electric power source comprises an induction coupler with at least one core ring that surrounds an alternating current carrying source cable and a winding cable wound around the at least one core ring, said winding cable being connected to the component interface cable;
wherein the induction coupler comprises an upper section with a first number of first core parts and a lower section with a second number of second core parts, wherein the winding cable is arranged in the upper section only, wherein at least one of the first number of first core parts is aligned with at least one of the second number of second core parts when the upper section is landed on the lower section; and
wherein the upper section is removable from the lower section.

2. The subsea heating assembly according to claim 1, wherein the alternating current carrying source cable is a direct electric heating cable arranged alongside a subsea pipeline in order to heat said subsea pipeline.

3. The subsea heating assembly according to claim 1, wherein the induction coupler is adapted to take an open and a closed state, wherein in the closed state the at least one core ring encircles a void adapted to receive the alternating current carrying source cable and in the open state the at least one core ring exhibits a gap between two facing end sections of the at least one core ring through which the alternating current carrying source cable may pass.

4. The subsea heating assembly according to claim 1, wherein the at least one core ring comprises three sets of core rings, wherein each set is adapted to be associated with one phase of an electric source cable comprising three phases.

5. The subsea heating assembly according to claim 1, wherein the first number of first core parts is smaller than the second number of second core parts.

6. A method of heating a subsea component, the method comprising
a) arranging a component interface cable that is associated with the subsea component, the component interface cable being adapted to, when current is fed through it, cause induction losses or resistive losses in the component interface cable or in the subsea component;
b) arranging at least one core ring of an induction coupler around an electric source cable;
c) connecting the component interface cable to the induction coupler; and
d) delivering alternating electric current to the component interface cable via the induction coupler by feeding alternating current through the electric source cable;
wherein step b) comprises:
i) arranging a lower section of the induction coupler on one side of the electric source cable; and
ii) arranging an upper section of the induction coupler on another side of the electric source cable in such way that the at least one core ring of the induction coupler encircles the electric source cable, wherein the upper section comprises a first number of first core parts and the lower section comprises a second number of second core parts, wherein at least one of the first number of first core parts is aligned with at least one of the second number of second core parts to form the at least one core ring when the upper section is landed on the lower section; and
wherein the second number of second core parts are not wound with a winding cable of the induction coupler.

7. A method of heating a subsea component, the method comprising:
a) arranging a component interface cable in association with the subsea component, the component interface cable being adapted to, when current is fed through it, cause induction losses or resistive losses in the component interface cable or in the subsea component;

b) arranging at least one core ring of an induction coupler around an electric source cable;

c) connecting the component interface cable to the induction coupler; and d) delivering alternating electric current to the component interface cable via the induction coupler by feeding alternating current through the electric source cable, as a winding cable of the induction coupler is connected to the component interface cable;

wherein a lower section of the induction coupler is arranged on one side of the electric source cable and an upper section of the induction coupler is arranged on another side of the electric source cable;

e) adjusting a characteristic of the induction coupler by:
 i) retrieving the upper section to the surface;
 ii) altering at least one of a number of first core parts in the upper section and a number of turns with which a winding cable is wound around one or more of the number of first core parts, the at least one core ring being made up of at least one of the number of first core parts in the upper section and at least one second core part in the lower section; and
 iii) arranging the upper section back onto the lower section in a position where the at least one first core part is aligned with the at least one second core part so as to constitute the at least one core ring.

8. A subsea induction coupler adapted to be arranged in association with an alternating current carrying subsea source cable in order to couple electric power from the alternating current carrying subsea source cable to a winding cable which is wound around one or more core rings in the subsea induction coupler, comprising:

an upper section with a first number of first core parts; and a lower section with a second number of second core parts;

wherein the upper section and the lower section are adapted to be assembled together in such way that at least one of the first number of first core parts and at least one of the second number of second core parts together form at least one core ring that surrounds a channel capable of accommodating said alternating current carrying subsea source cable; and wherein the second number of second core parts are not wound with a winding cable of the subsea induction coupler.

9. The method of claim 6, further comprising altering at least one of a number of the first number of first core parts in the upper section and a number of turns with which a winding cable is wound around one of the first number of first core parts.

* * * * *